United States Patent [19]

Probstein et al.

[11] 4,309,291
[45] Jan. 5, 1982

[54] METHOD OF AND APPARATUS FOR CONTINUOUS FLOW FLOCCULATION AND CLARIFICATION

[75] Inventors: Ronald F. Probstein, Brookline; Michael A. Delichatsios, Cambridge, both of Mass.

[73] Assignee: Massachusetts Institute of Technology, Cambridge, Mass.

[21] Appl. No.: 811,413

[22] Filed: Jun. 29, 1977

Related U.S. Application Data

[63] Continuation of Ser. No. 446,666, Feb. 28, 1974, abandoned.

[51] Int. Cl.³ .............................................. C02F 1/52
[52] U.S. Cl. .................................... 210/713; 210/738; 210/197
[58] Field of Search .................. 210/42 R, 49, 45, 46, 210/51, 52, 59-61, 194, 197-199, 206

[56] References Cited

U.S. PATENT DOCUMENTS

| 1,956,420 | 4/1934 | Gleason et al. | 210/197 |
| 2,190,596 | 2/1940 | Dorr | 210/49 |
| 2,355,564 | 8/1944 | Sebald | 210/197 |
| 3,666,663 | 5/1972 | Walker | 210/49 |

*Primary Examiner*—Benoît Castel
*Attorney, Agent, or Firm*—Arthur A. Smith, Jr.

[57] ABSTRACT

A method of and apparatus for continuously removing dispersed particles which can be flocculated from a liquid containing said particles, such as wastewaters, wherein flocculation of said particles is caused to take place in a turbulent pipe flow by the injection and rapid mixing of a coagulant and/or coagulant aid in said turbulent pipe flow which simultaneously flocculates said particles and transports the mixture of flocculated particles and liquid into a settling tank for clarification. A controlled quantity of dispersed floc from said settling tank is continuously recirculated into said pipe flow at a station where mixing of the coagulant and/or coagulant aid is achieved, so as to reduce the length of said pipe to a desired size and the flow rate of said injected coagulant and/or coagulant aid.

5 Claims, 3 Drawing Figures

METHOD OF AND APPARATUS FOR CONTINUOUS FLOW FLOCCULATION AND CLARIFICATION

This invention was made under a contract with the United States Navy.

This is a continuation of application Ser. No. 446,666, filed Feb. 28, 1974, now abandoned.

The invention relates generally to a method of and apparatus for continuously removing dispersed particles which can be flocculated from a liquid containing said particles, and more particularly, to a method of and apparatus for continuously removing solid colloidal particles, ranging in size from tenths of a micron to tens of microns, from wastewater containing said solid colloidal particles to yield clarified water.

By way of background as to this specification, attention is called to the Doctoral thesis of the inventor Delichatsios, the work leading to the thesis being done at the Massachusetts Institute of Technology under the supervision of the inventor Probstein. The thesis was deposited in the M.I.T. library system on Mar. 3, 1975 and is of record in said application Ser. No. 446,666. Attention is also called to a journal article entitled "Scaling laws for coagulation and sedimentation," *Journal of Water Pollution Control*, Vol. 47, No. 5, May 1975, pp. 941–949.

One method that has been used for removing particles from wastewaters is by flocculating the particles into larger size particles in a flocculation tank in advance of a settling tank wherein clarification is accomplished. Flocculation is usually induced by mixing in the flocculation tank a suitable amount of coagulant (e.g., metal salts) and/or coagulant aid (e.g., organic polymers) by means of a stirrer paddle. Because the flow in the flocculator is both nonuniform and nonhomogeneous, regions of different flow conditions exist, so that deposition and breakup occur simultaneously. This has an adverse effect on the flocculation efficiency and increases the needed flocculator volume.

Accordingly, a principal object of the present invention is to provide a continuous flocculation and clarification system in which the simultaneous deposition and breakup problems encountered in conventional systems are essentially overcome and in which the volume requirements are reduced substantially compared to conventional systems.

Still further objects are apparent in the description that follows and are particularly pointed out in the appended claims.

In accordance with this invention, the mixture of said particles and liquid is caused to pass continuously through a pipe, generally of circular cross section, in which a turbulent flow simultaneously flocculates said particles and transports the mixture of flocculated particles and liquid into a conventional settling tank, where clarification is accomplished. The clarified effluent is continuously discharged from the settling tank. In this embodiment rapid mixing of the chemical coagulant and/or chemical coagulant aid is achieved by continuously injecting the required quantity of chemicals into the pipe flow near the input end of the pipe. The pipe diameter is selected such that essentially no breakup or deposition of the particles takes place in the fluid flowing within the pipe. This invention shows how this selection can be done by employing information on the nature of the fluid mechanical interactions between the flocculation, breakup and settling of the particles under turbulent flow conditions.

In order to reduce the required length of the pipe and the flow rate of injected coagulant and/or coagulant aid, continuous recirculation of dispersed floc is provided from the settling tank to a point in the turbulent pipe flow, where complete mixing of said coagulant and/or coagulant aid has been achieved. The recirculated dispersed floc flow rate is proportional to the pipe flow rate, and is effectively controlled so that flocculation of the particles is complete to the required degree prior to the discharge of the pipe flow into the settling tank. The recirculated floc size, which is of the order 100 $\mu$m, is controlled so that it is less than the stable floc size (i.e., the size above which the floc will break) characteristic of turbulent flow conditions in said pipe transporting said particles to the settling tank. In addition, the flow rate of said chemicals or chemical substances to enhance flocculation (i.e., coagulant and/or coagulant aid) is controlled so that it is reduced to the extent of the quantity of the chemicals continuously recirculated from the settling tank concurrently with said floc.

The detailed structure and method of operation of the invention is described more clearly with reference to the attached drawings wherein.

Figure 1:
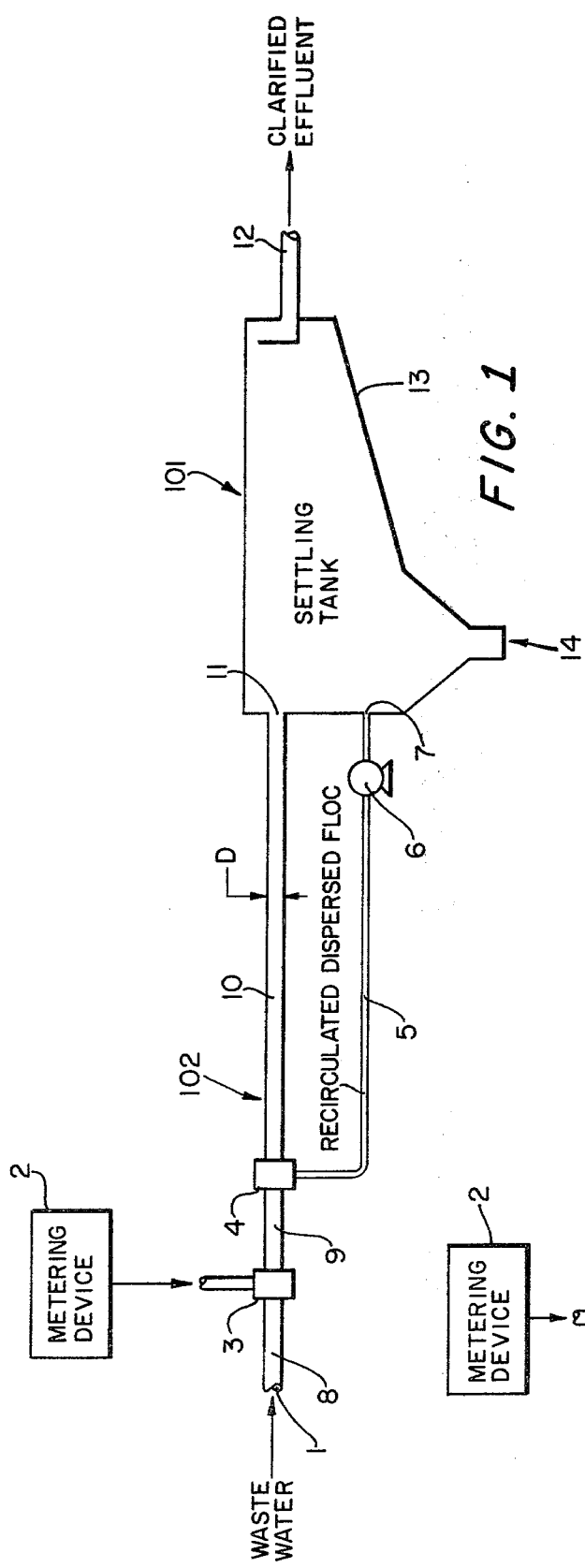
FIG. 1 shows schematically and in block diagram form apparatus in accordance with the present invention and includes a pipe wherein flocculation occurs.

Turning now to FIG. 1, there is shown at 101 apparatus for continuously removing particles that can be flocculated from a liquid containing such particles. The apparatus 101 comprises a relatively long, composite pipe that is labeled 102 and that is composed of three circular pipes of equal diameter D. To simplify this explanation, the three pipes are numbered 8, 9 and 10. Wastewater containing colloidal solid particles ranging in size from tenths of a micron to tens of microns is continuously introduced at the input end labeled 1 of the pipe 102. It is assumed that any larger size particles have been previously removed, for example, by passing the wastewater through a conventional screen and grit removal chamber (not shown in FIG. 1). The required coagulant and/or coagulant aid is continuously injected from a metering device 2 into pipe 102 at station 3 through suitable piping and near the input end 1. Complete mixing of the coagulant and/or coagulant aid, which acts to effect or aid coagulation with said flow is achieved in the pipe 9, at the end of which recirculated dispersed floc is continuously added at a station 4 through a suitable pipe 5. Effective flocculation starts at the station 4, and the small solid particles contained in the wastewater are flocculated in the pipe 10 with the big flocs of the recirculated stream. The flow rate of the recirculated dispersed floc is controlled so that flocculation to the required degree is accomplished before the mixture is discharged through output end 11 of the pipe 102 into the conventional settling tank 13. The clarified effluent is continuously discharged through suitable piping 12. The settled floc (sludge) is continuously withdrawn from the settling tank 13 at discharge station 14. The quantity of dispersed floc required for recirculation is withdrawn through the input end 7 of the pipe 5 by a pump 6, and is conducted through the pipe 5 to the injection station 4. The diameter of the pipe 5 is taken such that the stable floc size corresponding to the flow conditions in this pipe is less than the stable floc size characteristic of the flow conditions in the pipe 10.

Figure 2:
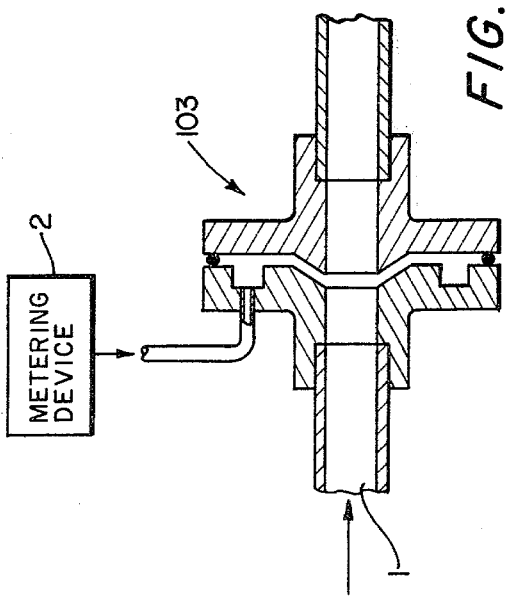
FIG. 2 is a side section view of a rapid mixing device for the injection of coagulant and/or coagulant aid into the system of FIG. 1.

In FIG. 2 there is shown a detail of a device 103 for continuously injecting the coagulant and/or coagulant aid at the station 3 in FIG. 1, to ensure rapid mixing with the flow in the pipe 9. The flow rate of said coagulant and/or coagulant aid is so controlled by the appropriate metering device 2 that it is reduced by an amount equal to the quantity of coagulant and/or coagulant aid concurrently recirculated through the pipe 5 with the recirculated dispersed floc. A suitable entrance design is also provided for the continuous injection of said floc from the pipe 5 at station 4 into the pipe 10.

Figure 3:
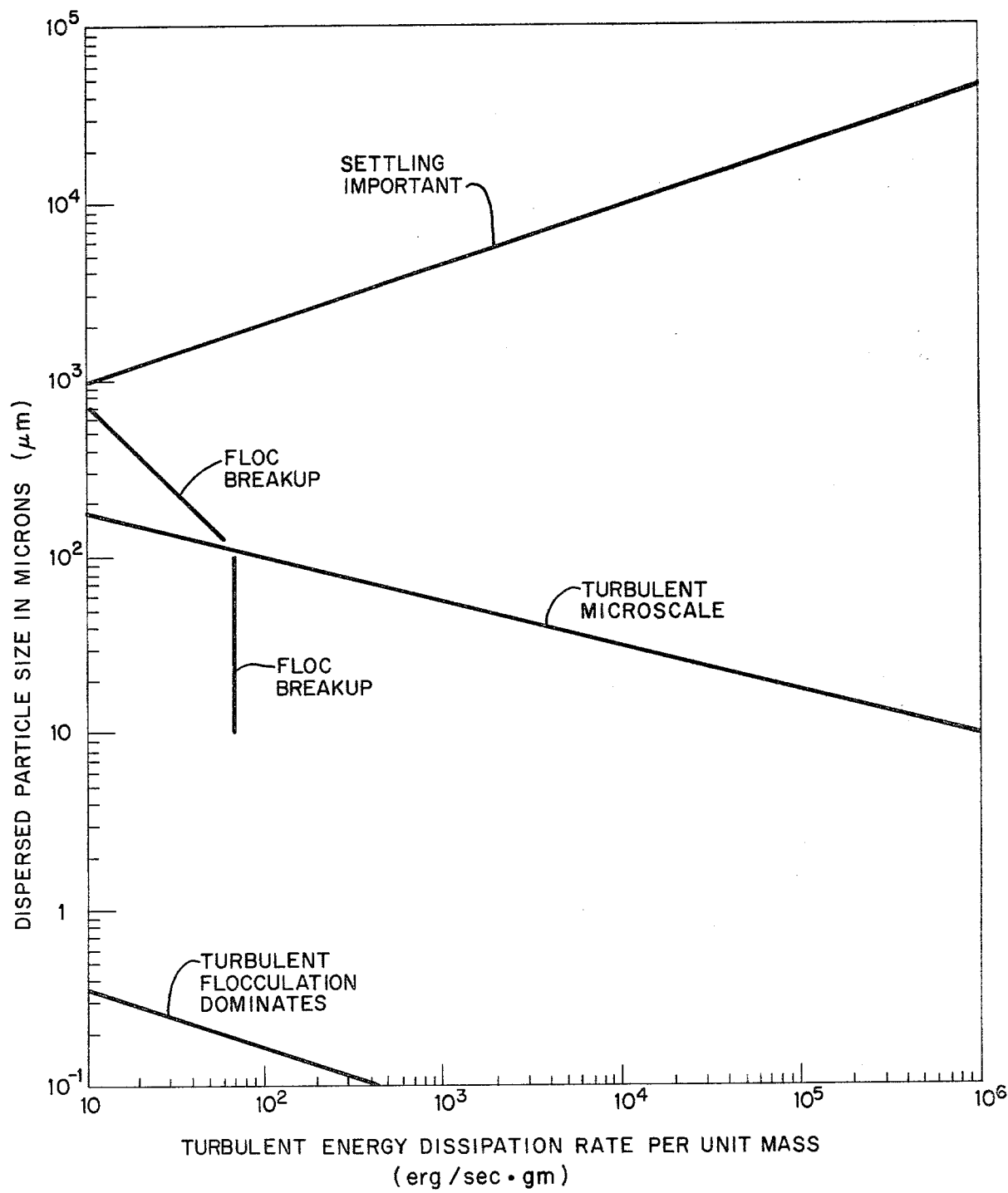
FIG. 3 is a graph depicting a typical relationship between particle size and the rate of turbulent energy dissipation per unit mass in said pipe flow, with respect to the phenomena of flocculation, breakup and settling.

In FIG. 3, a typical relationship between particle sizes dispersed in a liquid medium, such as a wastewater containing colloidal solid particles, and the rate of turbulent energy dissipation per unit mass is given with respect to flocculation, breakup and settling of said particles. FIG. 3 also shows the size of the microscale of the turbulent eddies in the flow, for comparison with the size of the said particles. For turbulent pipe flow, the effective rate of energy dissipation per unit mass, $\epsilon$, is given approximately by:

$$\epsilon = 4(u_T^3/D).$$

Here
$u_T$ = turbulent friction velocity
and
$D$ = diameter of the pipe 102.

The rate of energy dissipation per unit mass in the pipe 10 of FIG. 1 should be selected such that no breakup or deposition of said particles and said flocs is probable during the flow in the pipe 10. For example, the rate of energy dissipation should not exceed the value $\epsilon = 70$ erg/sec.gm for the typical plot given in FIG. 3. The maximum size of the floc recirculated through the pipe 5 from the settling tank 13 in FIG. 1 is selected such that it is less than the stable floc size corresponding to the flow conditions in the pipe 10 of FIG. 1. For example, for the value of the rate of turbulent energy dissipation per unit mass in the pipe 10 of FIG. 1, the size of said flocs should not exceed the value of 100 $\mu$m for the typical plot given in FIG. 3. Thus, by intelligently utilizing the knowledge of the domains depicted in FIG. 3 for the design of the turbulent pipe flocculation, and by eliminating the conventional flocculation tank, the space requirements for the flocculation and clarification are substantially reduced and the flocculation efficiency increased.

The following example is presented to illustrate further the invention, although it is not intended that the invention is limited thereto.

EXAMPLE

The specific example includes the description of a shipboard wastewater treatment plant for the continuous removal of colloidal solids. For a cargo or naval ship with a population of 200 persons and an average U.S.A. standard sewage flow of 80 gal/person/day, the continuous flow rate is approximately 12 gpm (gal/min). The concentration of colloidal solids for dry weather conditions is approximately 480 mg/liter, or since their density is smaller to that of water, 480 ppm (parts/million). The maximum content of colloidal solids in clarified water permitted under EPA standards for discharge at sea is 150 ppm. Hence the required reduction of the total number of solid particles in the wastewater per unit volume has to be approximately equal to a factor of four, with a safety factor and assuming the size distribution of said particles is not too broad.

In the system considered it is assumed that particles of a size larger than approximately ten microns have been removed by a suitable screen and grit removal chamber not shown in FIG. 1.

The dosage of the coagulant and coagulant aid is typically taken to be 150 mg/liter and 2 mg/liter respectively, as discussed in more detail, for example, in the article "Chemicals and Clarifiers," by T. J. Tofflemire and L. J. Hettling in Water and Wastes Engineering, vol. 10, No. 11, November 1973, pp. F-24–F-26. For a water solution of both the coagulant and coagulant aid of 50 percent weight concentration, the required flow rate of said solution injected at station 3 of FIG. 1 is approximately 15 cm$^3$/min.

The diameter of the pipe 9 in FIG. 1 is taken to be 4 cm so as to be equal to the diameter of the pipe 10. The length of pipe 9 required for complete mixing of said chemicals with the wastewater flow is taken to be five times the diameter of the pipe 9 based on laboratory experiments carried out by the inventors using the injection device depicted in FIG. 2.

The volume fraction of floc inside the pipe 10 of FIG. 1, recirculated from settling tank 13, is arbitrarily taken to be three percent. Then the flow rate of the recirculated dispersed floc (floc plus water) injected at station 4 is approximately 5 gpm, for a volume fraction of said floc inside the pipe 5 of FIG. 1, recirculated from settling tank 13, arbitrarily taken to be 10 percent. Hence the flow rate through the pipe 10 will be equal to 17 gpm. The average size of the recirculated floc is of the order 100 $\mu$m.

The effective rate of turbulent energy dissipation per unit mass in the flow inside the pipe 10 is selected to be $\epsilon = 60$ erg/sec.gm so that according to FIG. 3, breakup and deposition of the flocculating particles inside the pipe 10 is not probable.

The friction velocity required for the calculation of the rate of turbulent energy dissipation per unit mass is equal to:

$$u_T = U\sqrt{f/8},$$

where the friction coefficient f is:

$$f = 0.316/Re^{\frac{1}{4}}.$$

These relations may be found in any standard fluid mechanics text as, for example, "Principles of Fluid Mechanics" by W. H. Li and S. H. Lam, Addison-Wesley, Reading, Mass., 1964, pp. 274 and 275. Here U is the average pipe velocity and Re is the pipe flow Reynolds number.

From said required flow rate through the pipe 10 of FIG. 1 and the selected rate of turbulent energy dissipation per unit mass in said pipe, the characteristics of the flow are calculated to be:
D = 4 cm,
Re = 32,000,
U = 76 cm/sec.

Here, D is the diameter of the pipe 10, Re is the Reynolds number of the flow in said pipe, and U is the average velocity of the flow in said pipe.

The flocculation inside the pipe 10 of the colloidal solid particles contained in the wastewater with the flocs recirculated from the settling tank 13 is the principal flocculation mechanism for the colloidal particles. The flocculation frequency of the colloidal particles with said recirculated floc is, according to laboratory experiments carried out by the inventors, approximately given by:

$$\omega \tau / \phi = 0.2.$$

Here, $\omega$ is said flocculation frequency in sec$^{-1}$, $\tau$ is the characteristic time in seconds of the turbulent microscale equal to $(\nu/\epsilon)^{\frac{1}{2}}$, where $\nu$ is the liquid kinematic viscosity, and $\phi$ is the volume fraction of recirculated floc inside the pipe 10. In the present example, $\omega$ is calculated to be approximately equal to 0.47 sec$^{-1}$.

The decrease in number of colloidal solid particles contained in the wastewater per unit volume per unit time is proportional to said flocculation frequency multiplied by the number of said colloidal particles per unit volume. Hence the time required for flocculation of the colloidal particles so that their number per unit volume is decreased by a factor of four is t = 3 sec.

The required length L of the pipe 10 is then approximately equal to:

$$L = Ut = 220 \text{ cm.}$$

The size of settling tank 13 is determined approximately from the settling time in said tank of the largest size flocs entering the tank from the pipe 10 (around 100 $\mu$m) and the flow rate in the pipe 10.

For a minimum size of said flocs of 80 $\mu$m, a ratio of the density of the flocs to that of the water of approximately 1.2, and an effective height of the settling tank 13 in FIG. 1 of 50 cm, the residence time in the settling tank, required for said floc settling is calculated to be twelve minutes, based on Stokes law settling velocities. Hence the volume of the tank 13 is approximately equal to twenty-eight ft$^3$, that is, the residence time multiplied by the flow rate in the pipe 10. An example of such a calculation may be found described in any standard wastewater treatment text as, for example, W. J. Weber, Jr., "Physicochemical Processes for Water Quality Control," Wiley-Interscience, New York, 1972.

The diameter of the pipe 5 in FIG. 1 for the 5 gpm recirculation of dispersed floc from the settling tank 13 is determined to be 2.7 cm, in order that the rate of turbulent energy dissipation per unit mass in the pipe 5 be approximately 70 erg/sec.gm. Hence, according to FIG. 3 the stable floc size in the pipe 5 is less than the stable floc size corresponding to the operating conditions in the pipe 10.

The total volume of the present flocculation and clarification system is approximately thirty ft$^3$. This volume is more than one order of magnitude smaller than the volume of the most compact conventional system for treating the same wastewater load. Such conventional systems are listed, for example, on page 38 of a study issued by the U.S. Navy Pollution Study Group, G. F. Rowell Project Director, entitled "Immediate Cost-Effective Abatement of Water Pollution From Navy Ships" Naval Postgraduate School, Monterey, Calif., March 1972.

In summary, a preferred structure and method of flocculation and clarification for continuously removing dispersed particles, which can be flocculated from a liquid containing said particles, such as wastewater containing colloidal solid particles, in accordance with the present invention, will include continuous flocculation of said particles in said liquid which is simultaneously being transported in a pipe in turbulent flow, with the mixture of flocculated particles and liquid going directly into a settling tank. Concurrently, dispersed floc from the settling tank will be continuously recirculated to a station in the pipe where mixing of coagulant and/or coagulant aid is achieved. The particle size and flow rate of the continuously recirculated dispersed floc is controlled in such a way that flocculation is accomplished before discharging the liquid medium into the settling tank, taking into account the limitations of breakup and deposition effects of the type depicted in FIG. 3.

While this structure has been described particularly as providing a means for removing solid colloidal particles from wastewater, it is to be understood that such structure can be utilized for the removal of any kind of dispersed particles (e.g., oil from water) which can be flocculated from a liquid containing said particles. Hence this invention is not to be construed as limited to the particular embodiment as shown in the drawing and described above, except as defined by the appended claims.

What is claimed is:

1. A method of continuously removing solid particles which can be flocculated from a liquid mixture containing said solid particles, comprising providing a flocculation pipe that discharges into a settling tank, the pipe having peripheral walls that delimit a substantially uniform, open, flow cross-section throughout the length of the pipe and being devoid of internal structure within the confines of said peripheral walls, continuously introducing said mixture and a required quantity of coagulant and/or coagulant aid into said pipe remote from the discharge into the settling tank and causing the contents of the pipe to flow through the pipe at a flow velocity sufficient to produce turbulent flow conditions throughout the pipe, with a rate of turbulent energy dissipation per unit mass in the pipe and a length of flow in the pipe great enough to ensure that flocculation occurs substantially entirely in the pipe, rather than in the settling tank, and with negligible deposition of particles and floc in the pipe, said rate of energy dissipation being less than about 70 erg/sec.gm to avoid particle and floc breakup.

2. A method as claimed in claim 1, further comprising providing a recirculation pipe leading from the settling tank to the flocculation pipe remote from the settling tank, and continuously recirculating dispersed floc from the settling tank to the flocculation pipe through the recirculation pipe and mixing the recirculated dispersed floc with the flow in the flocculation pipe.

3. A method in accordance with claim 2, further comprising controlling the flow conditions in the recirculation pipe so that the rate of energy dissipation per unit mass in the recirculation pipe is greater than that in the flocculation pipe, so that the stable floc size in the recirculation pipe is less than the stable floc size in the flocculation pipe, and so that there is negligible deposition of floc on the walls of the recirculation pipe.

4. A method in accordance with claim 1, wherein the length of flow in the flocculation pipe is sufficient to reduce the total number of solid particles per unit volume of the mixture in the pipe by a factor of at least approximately 4.

5. A method in accordance with claim 1, wherein the rate of turbulent energy dissipation per unit mass in the flocculation pipe is about 60 erg/sec.gm.

* * * * *